US008700899B1

(12) United States Patent
Juels

(10) Patent No.: US 8,700,899 B1
(45) Date of Patent: Apr. 15, 2014

(54) FORWARD-SECURE KEY UNLOCKING FOR CRYPTOGRAPHIC DEVICES

(75) Inventor: Ari Juels, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 55 days.

(21) Appl. No.: 13/534,135

(22) Filed: Jun. 27, 2012

(51) Int. Cl.
*H04L 29/06* (2006.01)
*H04L 9/30* (2006.01)
*G06F 11/30* (2006.01)

(52) U.S. Cl.
USPC ................. 713/167; 713/164; 380/30; 380/47

(58) Field of Classification Search
USPC ............................... 713/167, 164; 380/30, 47
See application file for complete search history.

(56) References Cited

U.S. PATENT DOCUMENTS

| | | | | |
|---|---|---|---|---|
| 5,668,877 | A * | 9/1997 | Aziz ................................ | 380/30 |
| 6,363,480 | B1 * | 3/2002 | Perlman ......................... | 713/164 |
| 6,795,555 | B1 * | 9/2004 | Parisien et al. ................. | 380/47 |
| 6,839,837 | B1 * | 1/2005 | Morishita ...................... | 713/164 |
| 7,409,545 | B2 * | 8/2008 | Perlman ......................... | 713/164 |
| 7,502,933 | B2 * | 3/2009 | Jakobsson et al. ............. | 713/172 |

OTHER PUBLICATIONS

SPINS: Security Protocols for Sensor Networks Adrian Perrig, et al. 2002.*
D.V. Bailey et al., "Wireless Authentication and Transaction-Confirmation Token," e-Business and Telecommunications, Communications in Computer and Information Science, 2011, pp. 186-198, vol. 130, Part. 3.
M. Bellare et al., "A Forward-Secure Digital Signature Scheme," Advances in Cryptology (CRYPTO), Lecture Notes in Computer Science (LNCS), Aug. 1999, pp. 431-448, vol. 1666.
R. Canetti et al., "Proactive Security: Long-Term Protection Against Break-Ins," RSA CryptoBytes, Spring 1997, pp. 1-16, vol. 3, No. 1.
R. Canetti et al., "Maintaining Security in the Presence of Transient Faults," Advances in Cryptology (CRYPTO), Aug. 1994, pp. 425-438.
R. Ostrovsky et al., "How to Withstand Mobile Virus Attacks (Extended Abstract)," 10th annual ACM Symposium on Principles of Distributed Computing (PODC), Aug. 1991, pp. 51-59.
Victor Shoup, "Practical Threshold Signatures," Advances in Cryptology (CRYPTO), Lecture Notes in Computer Science (LNCS), May 2000, pp. 207-220, vol. 1807.
Mark D. Corner, "Transient Authentication for Mobile Devices," Ph.D. Thesis, The University of Michigan, 2003, 111 pages.

(Continued)

*Primary Examiner* — Saleh Najjar
*Assistant Examiner* — Oleg Korsak
(74) *Attorney, Agent, or Firm* — Ryan, Mason & Lewis, LLP

(57) ABSTRACT

A first cryptographic device is configured to determine at least a key for a current epoch and a key for a subsequent epoch, and to transmit the keys for the current and subsequent epochs over a secure channel to a second cryptographic device. The second cryptographic device utilizes the key for the current epoch to decrypt an additional key that was encrypted for storage in a previous epoch, performs at least one cryptographic function using the decrypted additional key, utilizes the key for the subsequent epoch to encrypt the additional key for storage, and erases at least the key for the current epoch and the decrypted additional key. In such an arrangement, the additional key is initially locked under the key for the current epoch, then unlocked to perform the cryptographic function, and then locked again under the key for the subsequent epoch.

20 Claims, 4 Drawing Sheets

(56) References Cited

OTHER PUBLICATIONS

Frank Stajano, "Pico: No More Passwords!," Security Protocols Workshop, Aug. 2011, Lecture Notes in Computer Science (LNCS), pp. 49-81, vol. 7114.

S. Xu et al., "SocialClouds: Concept, Security Architecture and Some Mechanisms," Trusted Systems, Lecture Notes in Computer Science (LNCS), 2010, pp. 104-128, vol. 6163.

* cited by examiner

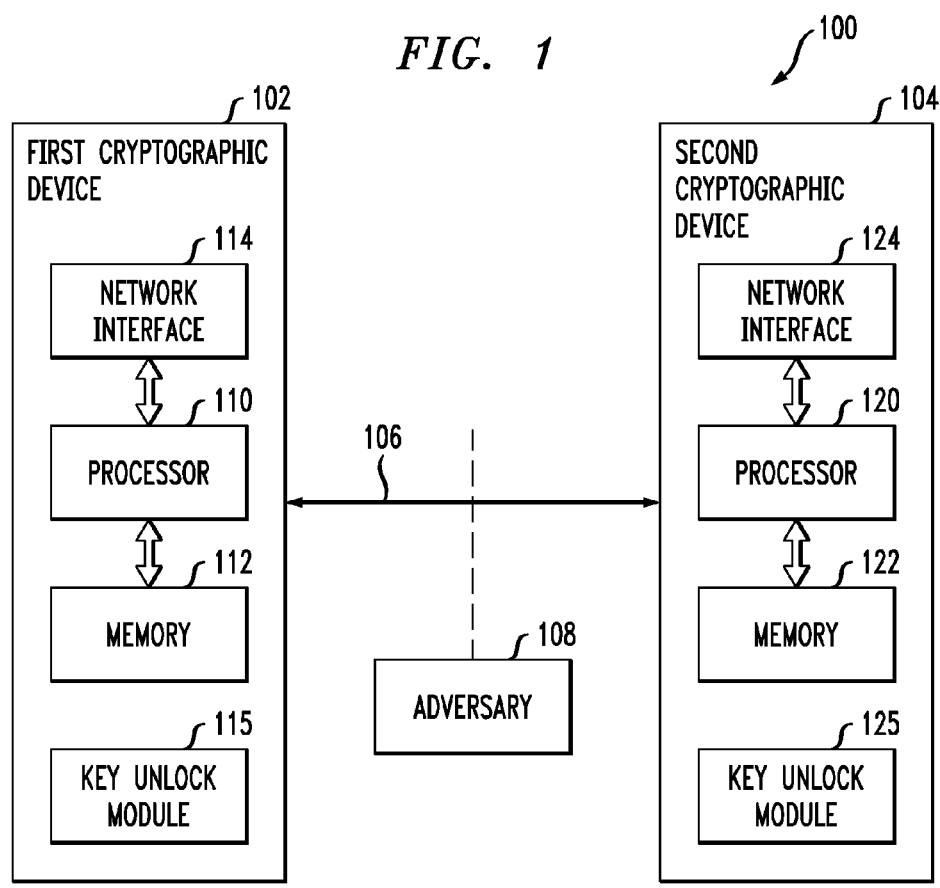
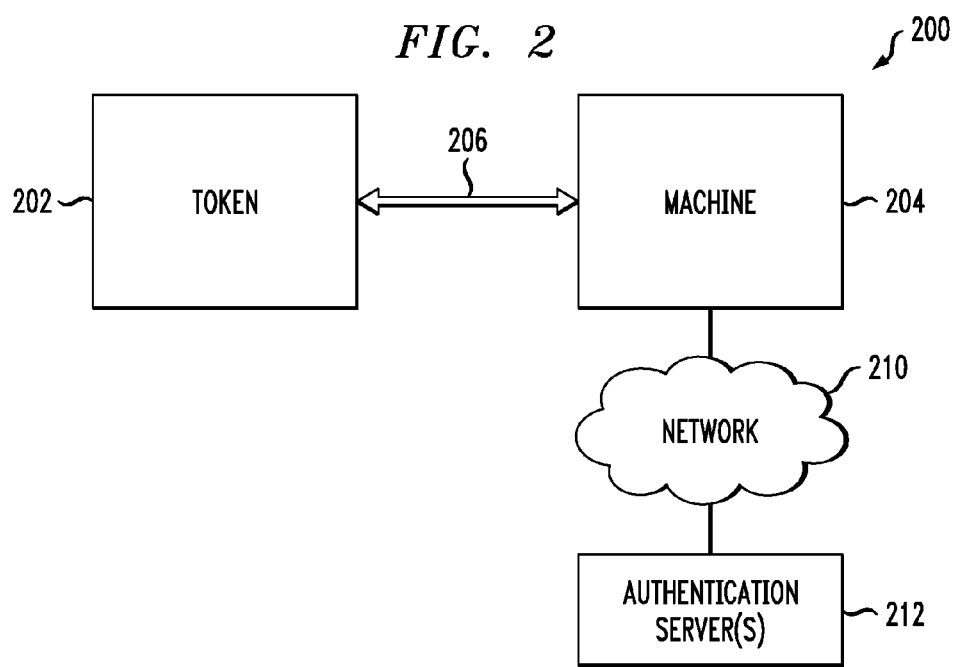

FORWARD-SECURE KEY UNLOCKING FOR CRYPTOGRAPHIC DEVICES

FIELD

The field relates generally to cryptography, and more particularly to cryptographic techniques implemented using authentication tokens, mobile telephones, computers or other types of cryptographic devices.

BACKGROUND

Cryptographic devices include, by way of example, one-time passcode (OTP) devices such as hardware authentication tokens. Authentication tokens are typically implemented as small, hand-held devices that display a series of passcodes over time. A user equipped with such an authentication token reads the currently displayed passcode and enters it into a computer or other element of an authentication system as part of an authentication operation. This type of dynamic passcode arrangement offers a significant security improvement over authentication based on a static password.

Conventional authentication tokens include both time-synchronous and event-synchronous tokens.

In a typical time-synchronous token, the displayed passcodes are based on a secret value and the time of day. A verifier with access to the secret value and a time of day clock can verify that a given presented passcode is valid.

One particular example of a time-synchronous authentication token is the RSA SecurID® user authentication token, commercially available from RSA, The Security Division of EMC Corporation, of Bedford, Mass., U.S.A.

Event-synchronous tokens generate passcodes in response to a designated event, such as a user pressing a button on the token. Each time the button is pressed, a new passcode is generated based on a secret value and an event counter. A verifier with access to the secret value and the current event count can verify that a given presented passcode is valid.

The security of authentication tokens and other cryptographic devices can be enhanced through the use of techniques such as seed rotation or proactive key updates. However, the keys stored on cryptographic devices can nonetheless remain vulnerable to compromise by an adversary.

SUMMARY

One or more illustrative embodiments of the present invention provide forward-secure key unlocking techniques for use with cryptographic devices.

In one embodiment, a first cryptographic device is configured to determine at least a key for a current epoch and a key for a subsequent epoch, and to transmit the keys for the current and subsequent epochs over a secure channel to a second cryptographic device. The second cryptographic device utilizes the key for the current epoch to decrypt an additional key that was encrypted for storage in a previous epoch, performs at least one cryptographic function using the decrypted additional key, utilizes the key for the subsequent epoch to encrypt the additional key for storage, and erases at least the key for the current epoch and the decrypted additional key. In such an arrangement, the additional key is initially locked under the key for the current epoch, then unlocked to perform the cryptographic function, and then locked again under the key for the subsequent epoch.

By way of example, the first cryptographic device may comprise a key unlock token, such as a mobile telephone, and the second cryptographic device may comprise a computer that communicates over a wireless network with the mobile telephone. A wide variety of other types of cryptographic devices and communication networks may be used in other embodiments.

It should also be noted that a key unlock token may be combined with a conventional authentication token into a single cryptographic device, although numerous other key unlock token configurations are possible.

The illustrative embodiments provide improved security for cryptographic keys stored on a mobile telephone, computer or other type of cryptographic device, by allowing another cryptographic device to unlock those keys only when needed to perform particular cryptographic functions, such as encryption, decryption or authentication. This substantially reduces the risk that the keys will be compromised by an adversary.

BRIEF DESCRIPTION OF THE DRAWINGS

FIG. 1 is a block diagram of a communication system with forward-secure key unlocking functionality in an illustrative embodiment of the invention.

FIG. 2 shows one possible implementation of the FIG. 1 system including cryptographic devices in the form of a key unlock token and a machine in an illustrative embodiment of the invention.

DETAILED DESCRIPTION

Figure 3A:
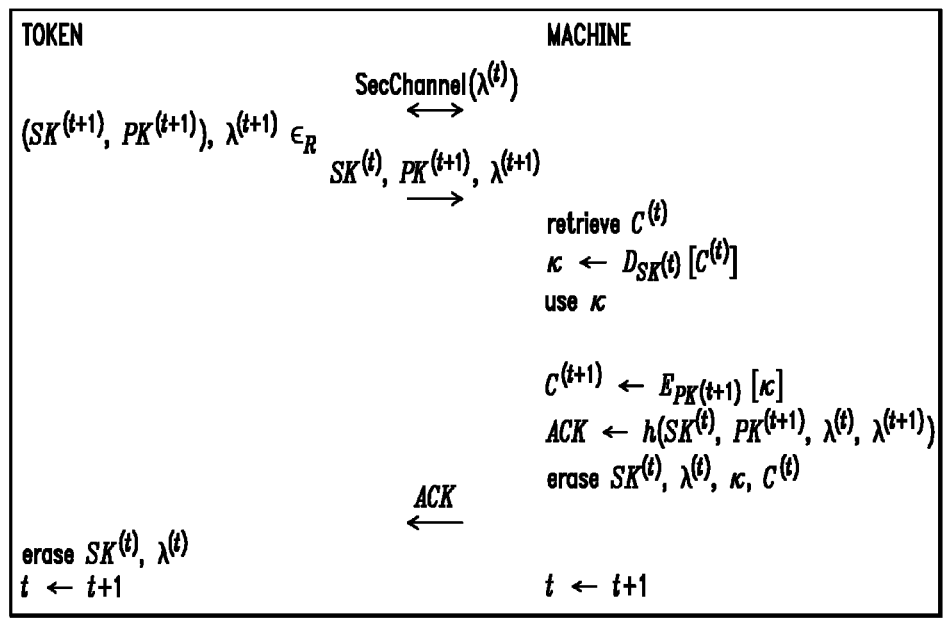
FIGS. 3A, 3B and 3C are diagrams illustrating data flows associated with respective embodiments of forward-secure key unlock protocols implemented in the system of FIG. 1 or FIG. 2. These figures are collectively referred to herein as FIG. 3.

Illustrative embodiments of the present invention will be described herein with reference to exemplary communication systems and associated processing devices. It is to be appreciated, however, that the invention is not restricted to use with the particular illustrative system and device configurations shown. Accordingly, the term "communication system" as used herein is intended to be broadly construed so as to encompass any type of system in which multiple processing devices can communicate with one another. Also, the term "cryptographic device" as used herein is intended to be construed broadly, so as encompass any type of processing device that incorporates cryptographic functionality.

As will be described, the present invention in one or more illustrative embodiments provides forward-secure key unlocking techniques for use with key unlock tokens and other types of cryptographic devices.

FIG. 1 shows a communication system 100 that incorporates forward-secure key unlocking functionality in an illustrative embodiment. The system 100 comprises a first cryptographic device 102 that is configured to communicate with a second cryptographic device 104 over one or more network connections 106.

The system 100 is subject to attack by an adversary 108 that can potentially eavesdrop on the network connections 106 and can compromise at least one of the first and second cryptographic devices. Additional assumptions will be made below regarding the adversary 108 in the context of the embodiments of FIG. 3.

The cryptographic devices 102 and 104 may comprise respective processing devices, such as a mobile telephone, a computer or other type of communication device. Each such processing device generally comprises at least one processor and an associated memory, and implements one or more functional modules for controlling certain features of the system 100. A cryptographic device may also be implemented as a separate entity within a processing device. One example of such an arrangement is a software key unlock token installed within a mobile telephone or computer.

The system 100 in the present embodiment implements one or more processes for forward-secure key unlocking. Examples of such processes performed by exemplary first and second cryptographic devices will be described in greater detail below in conjunction with FIG. 3, but it is to be appreciated that numerous other types of processes may be used in other embodiments.

The first cryptographic device 102 in the present embodiment comprises a processor 110 coupled to a memory 112. The processor 110 may comprise a microprocessor, a microcontroller, an application-specific integrated circuit (ASIC), a field-programmable gate array (FPGA) or other type of processing circuitry, as well as portions or combinations of such circuitry elements. The memory 112 may comprise random access memory (RAM), read-only memory (ROM) or other types of memory, in any combination.

The memory 112 and other memories disclosed herein may be viewed as examples of what are more generally referred to as "computer program products" storing executable computer program code.

Also included in the first cryptographic device 102 is network interface circuitry 114. The network interface circuitry 114 allows the first cryptographic device 102 to communicate with the second cryptographic device 104 over at least one network, and may comprise one or more conventional transceivers.

The first cryptographic device 102 further includes a key unlock module 115. This module may be implemented at least in part in the form of software that is stored in memory 112 and executed by processor 110. The key unlock module 115 may be configured to unlock one or more keys that are stored in encrypted form on the second cryptographic device 104, in a manner to be described below.

The second cryptographic device 104 in the present embodiment comprises a processor 120 coupled to a memory 122. The processor 120, like processor 110 in first cryptographic device 102, may comprise a microprocessor, a microcontroller, an ASIC, an FPGA or other type of processing circuitry, as well as portions or combinations of such circuitry elements, and the memory 122 may comprise RAM, ROM or other types of memory, in any combination.

Also included in the second cryptographic device 104 is network interface circuitry 124. The network interface circuitry 124 allows the second cryptographic device 104 to communicate with the first cryptographic device 102 over at least one network, and may comprise one or more conventional transceivers.

The second cryptographic device 104 further includes a key unlock module 125. This module may be implemented at least in part in the form of software that is stored in memory 122 and executed by processor 120. The key unlock module 125 is generally configured to interact with the key unlock module 115 of first cryptographic device 102, so as to allow one or more keys that are stored in encrypted form to be unlocked under the control of the first cryptographic device 102.

The first and second cryptographic devices 102 and 104 may communicate over any number of different types of networks, including, for example, a global computer network such as the Internet, a wide area network (WAN), a local area network (LAN), a satellite network, a telephone or cable network, a cellular network, a wireless network such as WiFi, Bluetooth or WiMAX, an RFID network, or various portions or combinations of these and other types of networks.

The communication system 100 as shown in FIG. 1 may be configured, for example, to allow a particular user associated with the first cryptographic device 102, which may be a key unlock token in the form of a mobile telephone, to unlock a key associated with the second cryptographic device 104, which may be a computer. The term "user" in this context is intended to be broadly construed, and may encompass a human user, or at least a portion of an associated cryptographic device, or combinations thereof.

It is to be appreciated that the particular set of elements shown in FIG. 1 for providing forward-secure key unlocking functionality is presented by way of example, and in other embodiments additional or alternative elements may be used.

As mentioned previously, various elements of system 100 such as the key unlock modules 115 and 125 may be implemented at least in part in the form of software. Such software is stored and executed utilizing respective memory and processor elements of at least one processing device. The system 100 may include additional or alternative processing platforms, as well as numerous distinct processing platforms in any combination, with each such platform comprising one or more computers, servers, storage devices or other types of processing devices.

Such processing platforms may include cloud infrastructure comprising virtual machines (VMs) and one or more associated hypervisors. An example of a commercially available hypervisor platform that may be used to implement portions of the communication system 100 is the VMware® vSphere™ which may have an associated virtual infrastructure management system such as the VMware© vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of the system 100.

FIG. 2 shows a communication system 200 corresponding generally to an implementation of communication system 100 in which first cryptographic device 102 comprises a key unlock token 202 and second cryptographic device 104 comprises another type of processing device, also referred to herein as a machine 204, that stores a locked key which can be unlocked by the key unlock token 202. It is assumed that these devices communicate with one another wirelessly over a secure channel 206. The machine 204, which may comprise a computer, is coupled via a network 210 with one or more authentication servers 212.

The key unlock token 202 may be combined with an otherwise conventional time-synchronous or event-synchronous authentication token into a single cryptographic device, although numerous other key unlock token configurations are possible.

The one or more authentication servers 212 may be used to authenticate a user associated with key unlock token 202, and may be omitted in other embodiments. In the system 200, the authentication server 212 is configured as a back-end authentication server, in that it communicates with machine 204 over a network, but other types of authentication servers may be used.

A wide variety of authentication processes may be implemented using a key unlock token 202, machine 204 and authentication server 212 arranged as shown in FIG. 2. Examples of conventional authentication processes are disclosed in A. J. Menezes et al., Handbook of Applied Cryptography, CRC Press, 1997, which is incorporated by reference herein. These conventional processes, being well known to those skilled in the art, will not be described in further detail herein, although embodiments of the present invention may incorporate aspects of such processes.

The operation of communication system 200 in performing key unlock protocols will now be described with reference to the corresponding protocol diagrams of FIG. 3. The three exemplary protocols of FIGS. 3A, 3B and 3B to be described below more particularly include key unlock protocols based on public-key cryptography, symmetric-key cryptography, and public-key cryptography with derivation of secure channel session keys, respectively. Each of the key unlock protocols is carried out between the token 202 and machine 204 using secure channel 206.

It is assumed that the secure channel 206 is established using a protocol SecChannel($\lambda$) that creates a secure channel between the token 202 and machine 204 under a shared session key $\lambda$, also referred to herein as a secure channel session key. In the present embodiments, the secure channel session key is refreshed or otherwise updated in conjunction with each of a plurality of epochs, and the secure channel session key for a given epoch t is therefore more particularly denoted $\lambda^{(t)}$. It may be further assumed that, upon initialization, the token 202 and machine 204 share an initial session key $\lambda^{(0)}$. Thus, the epochs may be denoted by integers, with $\lambda^{(t)}$ in the protocols of FIG. 3 denoting a current epoch and $\lambda^{(t+1)}$ denoting an immediately subsequent epoch relative to the current epoch. Other keys are also updated in each of the epochs, as will be described. The epochs may be defined based on time, events or other information.

In each of the FIG. 3 protocols, the objective is to safeguard a cryptographic key $\kappa$ that is utilized by machine 204 to perform one or more cryptographic functions, by locking the cryptographic key $\kappa$ in encrypted form on machine 204 when that key is not in use, under the control of the token 202. Thus, in the present embodiments, the token 202 enables decryption of and access to the cryptographic key $\kappa$ by the machine 204. Once decrypted or unlocked by the token 202, the cryptographic key $\kappa$ may be used by the machine 204 to perform any type of cryptographic function or set of functions, including encryption, decryption or authentication, as well as combinations of these and other functions. The key or keys used to encrypt cryptographic key $\kappa$ on the machine 204 are updated in each of the epochs by the token 202, along with the secure channel session key $\lambda$.

With regard to adversary 108, it is assumed in these embodiments that the adversary 108 can compromise either the token 202 or the machine 204, but not both. In compromising either token 202 or machine 204, the adversary gains complete control of the device. However, as indicated previously, the adversary does not control both the token and the machine in the same epoch, as no protection of $\kappa$ is possible in this case. Moreover, it is assumed that the adversary cannot compromise the machine 204 during a key unlock protocol execution, as $\kappa$ is exposed on the machine during that time. Finally, it is assumed that at all times, the adversary can control the connections between the token and machine, and so can eavesdrop on the secure channel 206 and tamper with communications arbitrarily. The various data flows shown in the protocol diagrams may therefore be subject to timeouts by the participating devices. Thus, for example, if a timeout occurs before receipt of an expected data flow, the receiving device expecting the data flow may abort the protocol.

Referring now to FIG. 3A, a key unlock protocol based on public-key cryptography is shown. An advantage of using public-key cryptography is that the key $\kappa$ can be refreshed on the machine 204 without the involvement of the token 202. In this protocol, $D_{SK}$ and $E_{PK}$ denote decryption and encryption operations performed using respective secret key SK and public key PK of a public-key cryptography key pair (SK, PK). Also, h denotes a hash function, and the symbol $\epsilon_R$ denotes random generation.

In embodiments such as that of FIG. 3A that are based on public-key cryptography, the key pairs (SK,PK) may be more particularly generated using discrete-log public-key cryptography based on elliptic curves, although other types of public-key cryptography may be used.

As noted above, a secure channel is established between token 202 and machine 204 using a secure channel session key $\lambda^{(t)}$ for current epoch t. The secure channel protocol is not described in detail herein, but may be implemented, for example, using a conventional secure sockets layer (SSL) protocol, or other suitable secure channel protocol, as will be appreciated by those skilled in the art. In an SSL implementation, the secure channel protocol may be realized as an SSL connection in which $\lambda^{(t)}$ is treated as a symmetric session key. Alternatively, the token and machine can use fresh certificates for each SSL session, and the protocol would then be modified to include a certificate distribution step.

The token 202 may also perform a posture assessment before participating in a session with the machine 204. For example, the token may assess the posture of the machine based on a Trusted Platform Module (TPM) attestation.

The token 202 generates a public-key cryptography key pair (SK,PK) for the subsequent epoch t+1, and a secure channel session key $\lambda^{(t+1)}$ for the subsequent epoch t+1, using random generation as indicated. The secret key and private key of the new key pair generated for subsequent epoch t+1 are denoted $SK^{(t+1)}$ and $PK^{(t+1)}$, respectively. The token keeps $SK^{(t+1)}$ secret, and sends to the machine 204 the secret key $SK^{(t)}$ for the current epoch, the public key $PK^{(t+1)}$ for the subsequent epoch, and the secure channel session key $\lambda^{(t+1)}$ for the subsequent epoch.

The machine 204 receives the keys $SK^{(t)}$, $PK^{(t+1)}$ and $\lambda^{(t+1)}$ from the token 202, retrieves a first ciphertext $C^{(t)}$ that was previously encrypted using the public key $PK^{(t)}$ for the current epoch in a previous iteration of the protocol, utilizes the secret key $SK^{(t)}$ for the current epoch to decrypt the first ciphertext $C^{(t)}$ to obtain the cryptographic key $\kappa$, uses the key $\kappa$ to perform at least one cryptographic function, and utilizes the public key $PK^{(t+1)}$ for the subsequent epoch to encrypt the key $\kappa$ to obtain a second ciphertext $C^{(t+1)}$. Although not expressly indicated in the protocol diagram, the machine 204 stores the second ciphertext $C^{(t+1)}$ in memory.

The machine 204 generates an acknowledgment (ACK) message for the token 202 as a hash of the secret key $SK^{(t)}$ for the current epoch, the public key $PK^{(t+1)}$ for the subsequent epoch, the secure channel session key $\lambda^{(t)}$ for the current epoch, and the secure channel session key $\lambda^{(t+1)}$ for the subsequent epoch, and then erases the keys $SK^{(t)}$ and $\lambda^{(t)}$ for the current epoch, the decrypted key $\kappa$, and the first ciphertext $C^{(t)}$. The ACK message serves as an indication that the key $\kappa$ has been successfully encrypted by the machine for storage utilizing the public key $PK^{(t+1)}$ for the subsequent epoch, and is sent to the token as indicated. Upon receipt of the ACK message, the token erases the keys $SK^{(t)}$ and $\lambda^{(t)}$ for the current epoch, and then both token and machine increment the epoch count as indicated.

In the FIG. 3A protocol, the key κ is initially locked under the public key $PK^{(t)}$ for the current epoch, then unlocked using $SK^{(t)}$ to perform at least one cryptographic function, and then locked again under the public key $PK^{(t+1)}$ for the subsequent epoch.

The FIG. 3A key unlock protocol and other key unlock protocols herein can be configured to incorporate an additional or alternative password-based mode of key recovery, for example, by encrypting κ in parallel under a public key PK* whose corresponding private key SK* is derived from a user password.

Figure 3B:
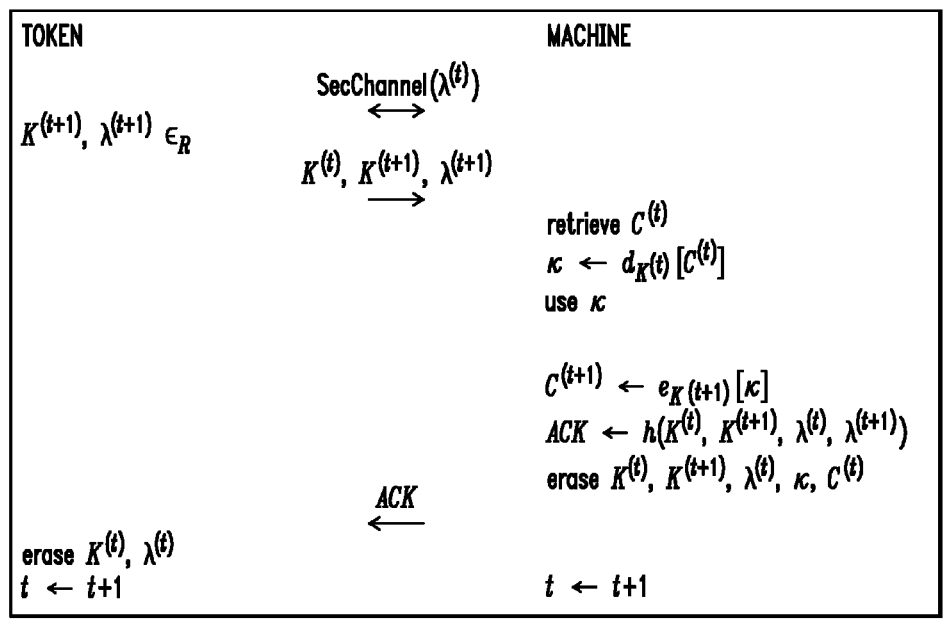

Turning now to FIG. 3B, an embodiment of a key unlock protocol based on symmetric-key cryptography is shown. This embodiment is generally similar to that described above in the context of FIG. 3A, but utilizes symmetric-key cryptography based on a symmetric key K in place of the public-key cryptography based on the key pair (SK, PK). In the protocol diagram of FIG. 3B, $d_K$ and $e_K$ denote symmetric-key decryption and symmetric-key encryption, respectively, using symmetric key K.

As in the previous protocol, a secure channel is established between token 202 and machine 204 using a secure channel session key $\lambda^{(t)}$ for current epoch t. The token 202 generates a symmetric cryptography key $K^{(t+1)}$ for the subsequent epoch t+1, and a secure channel session key $\lambda^{(t+1)}$ for the subsequent epoch t+1, using random generation as indicated. The token sends to the machine 204 the symmetric key $K^{(t)}$ for the current epoch, the symmetric key $K^{(t+1)}$ for the subsequent epoch, and the secure channel session key $\lambda^{(t+1)}$ for the subsequent epoch.

The machine 204 receives the keys $K^{(t)}$, $K^{(t+1)}$ and $\lambda^{(t+1)}$ from the token 202, retrieves a first ciphertext $C^{(t)}$ that was previously encrypted using the key $K^{(t)}$ for the current epoch in a previous iteration of the protocol, utilizes the key $K^{(t)}$ for the current epoch to decrypt the first ciphertext $C^{(t)}$ to obtain the cryptographic key κ, uses the key κ to perform at least one cryptographic function, and utilizes the key $K^{(t+1)}$ for the subsequent epoch to encrypt the key κ to obtain a second ciphertext $C^{(t+1)}$. Although not expressly indicated in the protocol diagram, the machine 204 stores the second ciphertext $C^{(t+1)}$ in memory.

The machine 204 generates an ACK message for the token 202 as a hash of the key $K^{(t)}$ for the current epoch, the key $K^{(t+1)}$ for the subsequent epoch, the secure channel session key $\lambda^{(t)}$ for the current epoch, and the secure channel session key $\lambda^{(t+1)}$ for the subsequent epoch, and then erases the keys $K^{(t)}$ and $\lambda^{(t)}$ for the current epoch, the key $K^{(t+1)}$ for the subsequent epoch, the decrypted key κ, and the first ciphertext $C^{(t)}$. The ACK message serves as an indication that the key κ has been successfully encrypted by the machine for storage utilizing the key $K^{(t+1)}$ for the subsequent epoch, and is sent to the token as indicated. Upon receipt of the ACK message, the token erases the keys $K^{(t)}$ and $\lambda^{(t)}$ for the current epoch, and then both token and machine increment the epoch count as indicated.

In the FIG. 3B protocol, the key κ is initially locked under the symmetric key $K^{(t)}$ for the current epoch, then unlocked using $K^{(t)}$ to perform at least one cryptographic function, and then locked again under the symmetric key $K^{(t+1)}$ for the subsequent epoch.

Figure 3C:
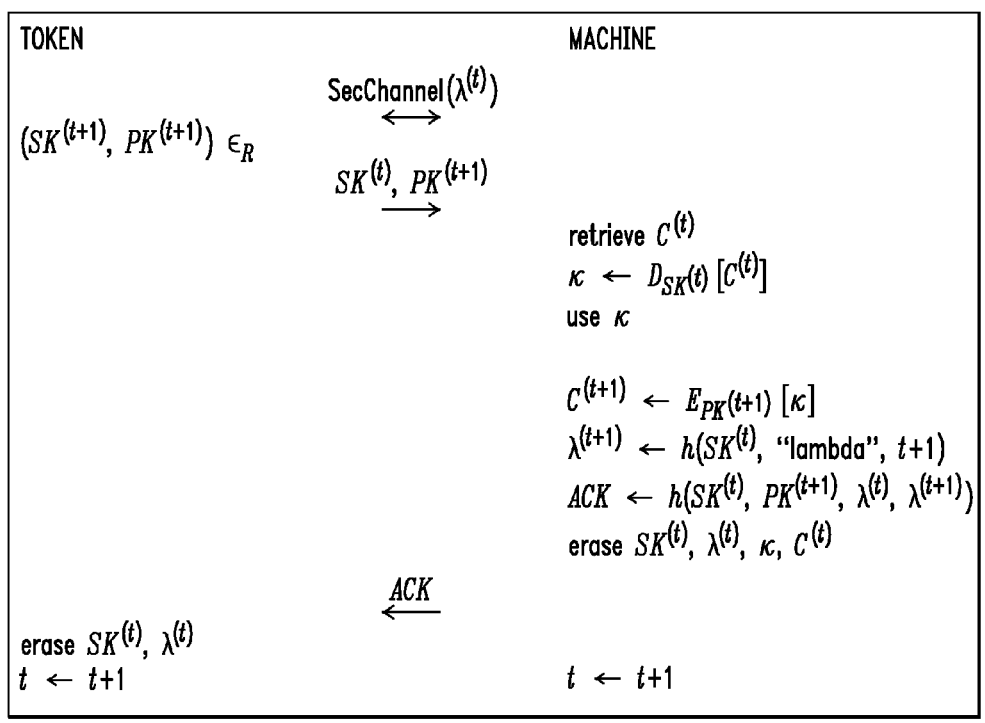

FIG. 3C shows another embodiment of a key unlock protocol utilizing public-key cryptography but with derived secure channel session keys. The protocol is generally the same as that previously described in conjunction with FIG. 3A, but instead of the token 202 sending the secure channel session key $\lambda^{(t+1)}$ to the machine 204, the machine derives the session key $\lambda^{(t+1)}$ as a hash of $SK^{(t)}$, a text string denoted "lambda," and the count of the subsequent epoch t+1. Alternative types of hashing arrangements may be used to generate the session key $\lambda^{(t+1)}$ as a function of $SK^{(t)}$ in other embodiments. Also, two different hash functions $h_1$ and $h_2$ may be used in place of hash function h to generate the respective session key $\lambda^{(t+1)}$ and ACK message in the FIG. 3C embodiment.

In the event that the token 202 fails to receive the ACK message from the machine 204 in any of the above-described protocols, it is possible that the machine successfully completed the protocol unilaterally. On failing to receive an ACK message, the token may set a flag indicating that rollback to a previous epoch is enabled, and retain the keys for the current epoch rather than erasing them as indicated in the protocol diagrams. Then if the secure channel fails for a given epoch t, the token can check if the rollback enabled flag is set, and if the rollback enabled flag is set, the token can attempt execution of the protocol for the previous epoch t−1. The token then resets the rollback enabled flag upon successful protocol completion as indicated by receipt of an ACK message.

The particular processing operations and other system functionality described in conjunction with the protocol diagrams of FIG. 3 are presented by way of illustrative example only, and should not be construed as limiting the scope of the invention in any way. Alternative embodiments can use other types of processing operations for forward-secure key unlocking. For example, certain aspects of the ordering or grouping of the process steps may be varied in other embodiments, or certain steps may be performed concurrently with one another rather than serially. Also, the particular types and arrangements of data exchanged in the various data flows may be altered in other embodiments.

It should also be noted that other embodiments may utilize alternative cryptographic functions in place of one or more of the hash functions utilized in the FIG. 3 embodiments. For example, instead of using a hash function h(x) one could apply a message authentication code (MAC) to a fixed message under key x. Numerous other alternative cryptographic functions may be used.

It is to be appreciated that forward-secure key unlocking functionality such as that described in conjunction with the protocol diagrams of FIG. 3 can be implemented at least in part in the form of one or more software programs stored in memory and executed by a processor of a processing device such as a mobile telephone or computer. As mentioned previously, a memory or other storage device having such program code embodied therein is an example of what is more generally referred to herein as a "computer program product."

As noted above, embodiments of the invention may involve use of token 202 for authentication. In such an arrangement, substantially continuous authentication can be provided through repeated invocation of one of the FIG. 3 protocols. Alternatively, the secure channel can be used to send a "heartbeat" signal from the token to the machine 204. For example, the token can send ACK messages tagged with incremental counter values back to the machine. If the Machine fails to receive an ACK message or some pre-determined number of ACK messages, it terminates the session.

It is possible to utilize multiple tokens simultaneously to authenticate to a resource. For example, a set of tokens may be used to provide respective key shares that are used to decrypt key material on a machine.

In other embodiments, a set of tokens can be configured to perform threshold decryption, such that the key shares are never directly exposed. In such an arrangement, each token performs a partial decryption of an encrypted machine key.

As noted above, the key κ unlocked on machine 204 can be used to perform a wide variety of different cryptographic functions.

For example, the machine 204 may be configured to provide full disk encryption under a different key K, with the unlocked key κ being used instead of a user password to derive or unlock the disk encryption key K.

Also, the token 202 can be used to perform weak local authentication, such as may be required for unlocking a screen saver on a computer. In this case, the key κ may go unused, in that the unlocking of κ in itself signals successful authentication.

As another example, the token 202 and machine 204 can serve as joint factors in authentication to a remote resource. Alternatively, the machine can itself be the remote resource. Release of κ in such arrangements results in successful authentication.

The token 202 may serve as an authenticator to an interface-poor machine, such as a printer, having a minimalist interface that makes password entry by a user difficult. In this case, the token may be used, for example, to initiate printing of a sensitive document on behalf of a user.

The token 202 can also serve as a password vault, providing a cache for passwords, particularly those used in web browsing. In this case, the existence of a forward-secure channel between the token 202 and machine 204 provides useful protection of passwords in transit, even though the unlocked key κ itself may go unused.

In some embodiments, a third entity, such as a server, may participate in an authentication or decryption session. For example, if a resource ρ on the machine 204 is to be available while a server connected to the machine is offline, then the server itself provides no extra protection for resources on the machine, in that an adversary can simply cut the connection to the server to access ρ. The server can nonetheless revoke credentials while connected, and such functionality requires only transient connection. However, highly-sensitive resources may be configured so as to require participation of the server or other third entity. In such situations, a compromise-resilient authentication or access control protocol may be used that involves the server or other third entity.

The embodiments described in conjunction with FIGS. 1-3 can provide a number of significant advantages relative to conventional practice. For example, the FIG. 3 protocols protect the cryptographic key κ against compromise by an adversary while the key is locked on machine 204. Moreover, these and other arrangements disclosed herein allow a mobile telephone, digital music player or other similar processing device already carried by a user to serve as a convenient token for unlocking resources on nearby machines such as laptop or desktop computers.

As indicated previously, key unlocking techniques of the type described above in conjunction with FIGS. 1-3 may be implemented in a wide variety of different applications. Two additional exemplary communication system applications that may incorporate forward-secure key unlocking will now be described with reference to FIGS. 4 and 5.

Figure 4:
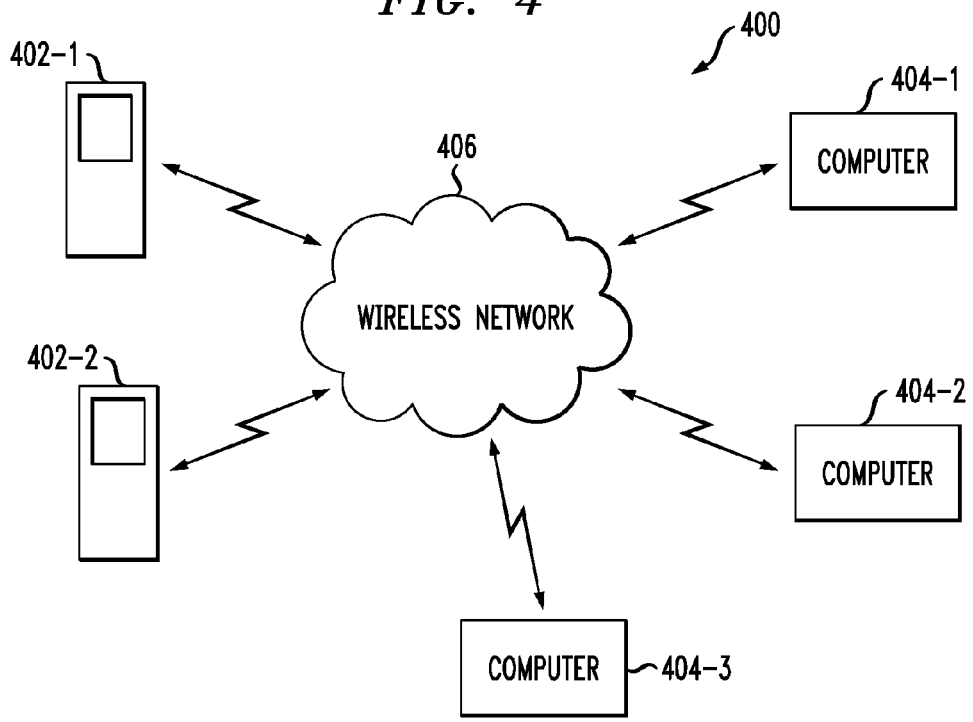
FIGS. 4 and 5 show exemplary embodiments of other communication systems that may incorporate forward-secure key unlocking functionality of the type illustrated in the protocol diagrams of FIG. 3.

Referring initially to FIG. 4, a communication system 400 comprises a plurality of mobile telephones 402-1 and 402-2 and computers 404-1, 404-2 and 404-3, configured to communicate with one another over a network 404. Any two or more of the devices 402 and 404 may correspond to first and second cryptographic devices configured to implement forward-secure key unlocking as previously described. Thus, for example, a given one of the mobile telephones 402 may be configured to unlock one or more keys stored on one of the computers 404.

Figure 5:
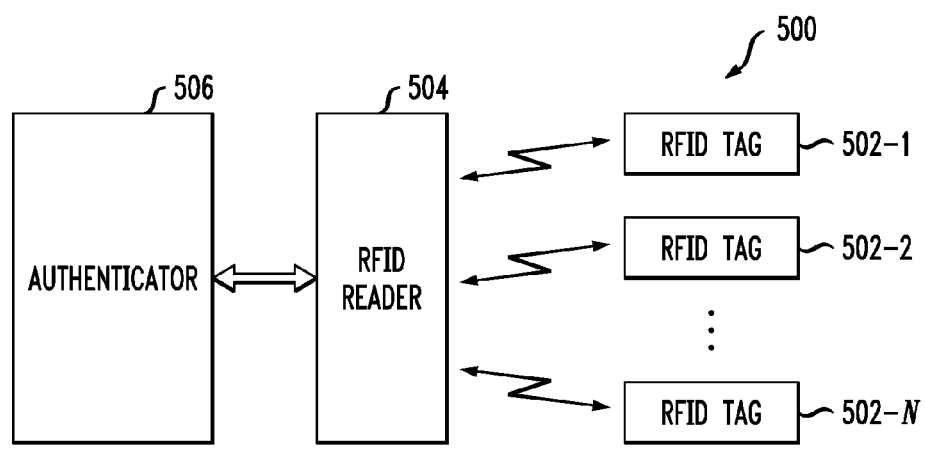

FIG. 5 shows another exemplary communication system 500 in an illustrative embodiment of the invention. In this embodiment, the system 500 is an RFID system comprising RFID tags 502-1, 502-2, . . . 502-N, a reader 504, and an authenticator 506. One or more of the RFID tags 502 may correspond to one of the cryptographic devices 102 or 104, and the reader 504, possibly in combination with the authenticator 506, may correspond to the other cryptographic device 102 or 104. The authenticator 506 may represent, for example, a back-end authentication server configured to authenticate secret values supplied to it by one or more of the RFID tags 502 via the reader 504. The system 500 may be configured, for example, such that keys stored on respective ones of the tags are unlocked by the reader, or keys stored on the reader are unlocked by the tags.

It should again be emphasized that the above-described embodiments of the invention are presented for purposes of illustration only. Many variations and other alternative embodiments may be used. For example, the techniques are applicable to a wide variety of other types of communication systems and cryptographic devices that can benefit from forward-secure key unlocking functionality. Accordingly, the particular illustrative configurations of system and device elements shown in FIGS. 1, 2, 4 and 5, and the particular illustrative forward-secure key unlock protocols shown in FIG. 3, can be varied in other embodiments. These and numerous other alternative embodiments within the scope of the appended claims will be readily apparent to those skilled in the art.

What is claimed is:

1. A method comprising the steps of:
receiving at least a key for a current epoch and a key for a subsequent epoch over a secure channel;
utilizing the key for the current epoch to decrypt an additional key that was encrypted for storage in a previous epoch;
performing at least one cryptographic function using the decrypted additional key;
utilizing the key for the subsequent epoch to encrypt the additional key for storage; and
erasing at least the key for the current epoch and the decrypted additional key;
the additional key thereby being initially locked under the key for the current epoch, then unlocked to perform said at least one cryptographic function, and then locked again under the key for the subsequent epoch;
wherein the receiving step further comprises receiving a secure channel session key for the subsequent epoch.

2. The method of claim 1 wherein the steps are performed by one cryptographic device that receives at least a portion of the keys for the current and subsequent epochs over the secure channel from another cryptographic device.

3. The method of claim 1 wherein the receiving step comprises receiving a secret key for the current epoch and a public key for the subsequent epoch.

4. The method of claim 3 wherein the utilizing steps comprise:
retrieving a first ciphertext that was previously encrypted using a public key for the current epoch;
utilizing the secret key for the current epoch to decrypt the first ciphertext to obtain the additional key;
utilizing the public key for the subsequent epoch to encrypt the additional key to obtain a second ciphertext;
storing the second ciphertext; and
erasing the first ciphertext.

5. The method of claim 1 wherein the receiving step comprises receiving a symmetric key for the current epoch and a symmetric key for the subsequent epoch.

6. The method of claim 5 wherein the utilizing steps comprise:
retrieving a first ciphertext that was previously encrypted using the symmetric key for the current epoch;
utilizing the symmetric key for the current epoch to decrypt the first ciphertext to obtain the additional key;
utilizing the symmetric key for the subsequent epoch to encrypt the additional key to obtain a second ciphertext;
storing the second ciphertext; and
erasing the first ciphertext.

7. A method comprising the steps of:
receiving at least a key for a current epoch and a key for a subsequent epoch over a secure channel;
utilizing the key for the current epoch to decrypt an additional key that was encrypted for storage in a previous epoch;
performing at least one cryptographic function using the decrypted additional key;
utilizing the key for the subsequent epoch to encrypt the additional key for storage; and
erasing at least the key for the current epoch and the decrypted additional key;
the additional key thereby being initially locked under the key for the current epoch, then unlocked to perform said at least one cryptographic function, and then locked again under the key for the subsequent epoch;
wherein the erasing step further comprises erasing a secure channel session key for the current epoch.

8. A method comprising the steps of:
receiving at least a key for a current epoch and a key for a subsequent epoch over a secure channel;
utilizing the key for the current epoch to decrypt an additional key that was encrypted for storage in a previous epoch;
performing at least one cryptographic function using the decrypted additional key;
utilizing the key for the subsequent epoch to encrypt the additional key for storage;
sending an acknowledgment that the additional key has been successfully encrypted for storage utilizing the key for the subsequent epoch; and
erasing at least the key for the current epoch and the decrypted additional key;
the additional key thereby being initially locked under the key for the current epoch, then unlocked to perform said at least one cryptographic function, and then locked again under the key for the subsequent epoch.

9. The method of claim 8 wherein the acknowledgment comprises a cryptographic function of at least the key for the current epoch and the key for the subsequent epoch.

10. The method of claim 9 wherein the acknowledgment comprises a cryptographic function of at least the key for the current epoch, the key for the subsequent epoch, a secure channel session key for the current epoch, and a secure channel session key for the subsequent epoch.

11. A computer program product comprising a processor-readable storage medium having embodied therein one or more software programs, wherein the one or more software programs when executed by a processor cause the steps of the method of claim 1 to be performed.

12. An apparatus comprising:
a cryptographic device comprising a processor coupled to a memory;
the cryptographic device being configured to receive at least a key for a current epoch and a key for a subsequent epoch over a secure channel, to utilize the key for the current epoch to decrypt an additional key that was encrypted for storage in the memory in a previous epoch, to perform at least one cryptographic function using the decrypted additional key, to utilize the key for the subsequent epoch to encrypt the additional key for storage in the memory, and to erase at least the key for the current epoch and the decrypted additional key;
the additional key thereby being initially locked under the key for the current epoch, then unlocked to perform said at least one cryptographic function, and then locked again under the key for the subsequent epoch;
the cryptographic device being further configured to receive a secure channel session key for the subsequent epoch.

13. The apparatus of claim 12 wherein the cryptographic device is configured to receive at least a portion of the keys for the current and subsequent epochs from another cryptographic device over the secure channel.

14. The apparatus of claim 12 wherein the cryptographic device comprises one of a mobile telephone and a computer.

15. A method comprising the steps of:
determining at least a key for a current epoch and a key for a subsequent epoch; and
transmitting the keys for the current and subsequent epochs over a secure channel;
the key for the current epoch being utilizable to decrypt an additional key that was encrypted for storage in a previous epoch, so as to permit performance of at least one cryptographic function using the decrypted additional key;
the key for the subsequent epoch being utilizable to encrypt the additional key for storage;
whereby the additional key is initially locked under the key for the current epoch, then unlocked to perform said at least one cryptographic function, and then locked again under the key for the subsequent epoch;
wherein the transmitting step further comprises transmitting a secure channel session key for the subsequent epoch.

16. The method of claim 15 wherein the steps are performed by one cryptographic device that transmits at least a portion of the keys for the current and subsequent epochs over the secure channel to another cryptographic device.

17. A computer program product comprising a processor-readable storage medium having embodied therein one or more software programs, wherein the one or more software programs when executed by a processor cause the steps of the method of claim 15 to be performed.

18. An apparatus comprising:
a cryptographic device comprising a processor coupled to a memory;
the cryptographic device being configured to determine at least a key for a current epoch and a key for a subsequent epoch, and to transmit the keys for the current and subsequent epochs over a secure channel;
the key for the current epoch being utilizable to decrypt an additional key that was encrypted for storage in a previous epoch, so as to permit performance of at least one cryptographic function using the decrypted additional key;
the key for the subsequent epoch being utilizable to encrypt the additional key for storage;
whereby the additional key is initially locked under the key for the current epoch, then unlocked to perform said at least one cryptographic function, and then locked again under the key for the subsequent epoch;

the cryptographic device being further configured to transmit a secure channel session key for the subsequent epoch.

19. The apparatus of claim 18 wherein the cryptographic device is configured to transmit at least a portion of the keys for the current and subsequent epochs to another cryptographic device over the secure channel.

20. An apparatus comprising:

a cryptographic device comprising a processor coupled to a memory;

the cryptographic device being configured to receive at least a key for a current epoch and a key for a subsequent epoch over a secure channel, to utilize the key for the current epoch to decrypt an additional key that was encrypted for storage in the memory in a previous epoch, to perform at least one cryptographic function using the decrypted additional key, to utilize the key for the subsequent epoch to encrypt the additional key for storage in the memory, to send an acknowledgment that the additional key has been successfully encrypted for storage utilizing the key for the subsequent epoch, and to erase at least the key for the current epoch and the decrypted additional key;

the additional key thereby being initially locked under the key for the current epoch, then unlocked to perform said at least one cryptographic function, and then locked again under the key for the subsequent epoch.

\* \* \* \* \*